United States Patent [19]

Miyamoto et al.

[11] Patent Number: 5,734,482
[45] Date of Patent: Mar. 31, 1998

[54] IMAGE PROCESSING APPARATUS AND ITS CONTROL METHOD

[75] Inventors: Ryosuke Miyamoto, Urayasu; Hideto Kohtani; Akihito Mori, both of Yokohama, all of Japan

[73] Assignee: Canon Kabushiki Kaisha, Tokyo, Japan

[21] Appl. No.: 498,875

[22] Filed: Jul. 6, 1995

[30] Foreign Application Priority Data

| Jun. 22, 1994 | [JP] | Japan | 7-156545 |
| Jul. 6, 1994 | [JP] | Japan | 6-154671 |

[51] Int. Cl.⁶ .................. H04N 1/00; H04N 1/40
[52] U.S. Cl. .................. 358/444; 358/404; 358/442
[58] Field of Search .................. 358/401, 404, 358/444, 403, 522, 523, 524; 395/115, 116

[56] References Cited

U.S. PATENT DOCUMENTS

| 4,695,895 | 9/1987 | Nagashima | 358/426 |
| 4,819,083 | 4/1989 | Kawai et al. | 358/294 |
| 5,379,124 | 1/1995 | Ikegaya et al. | 358/440 |

FOREIGN PATENT DOCUMENTS

| 0122170 | 7/1984 | Japan | 358/404 |
| 0183874 | 9/1985 | Japan | 358/404 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image processing apparatus for outputting image data in accordance with a designated output mode is constructed by an input unit to input the image data; a memory to store the image data inputted by the input unit; an output unit capable of outputting the image data stored in the memory in accordance with the output mode; a discrimination unit to discriminate a remaining capacity of the memory; and a change unit to change the output mode in the case where it is discriminated by the discrimination unit that the remaining capacity of the memory lacks. In the case where the designated output mode is a mode for discontinuously outputting the image data inputted continuously by the input unit by the output unit, the change unit changes the mode to continuously output the image data.

20 Claims, 10 Drawing Sheets

IMAGE PROCESSING APPARATUS AND ITS CONTROL METHOD

BACKGROUND OF THE INVENTION

1. Field of the Invention

The present invention relates to an image processing apparatus for processing image data and to its control method. More particularly, the invention relates to an image processing apparatus which stores image data to memory means and, after that, can output the image data and to its control method.

2. Related Background Art

Hitherto, there has been known a digital copying machine in which after all of images of one set were stored into a memory which can store image data of a plurality of pages, the image data is read out from the memory in accordance with an output mode such as one side, two-sides, 2in1, 4in1, brochure mode, staple sort, or the like. In this instance, the operator designates a desired output mode and sets originals to a document feeder, thereby allowing a scanner to read the originals. After completion of the reading of all of the originals, it is possible that the operator doesn't wait for an output but moves away from the copying machine and takes away the originals, and comes back to pick up the output copies at a proper timing of the end of a job. Such a method is effective in the case where the number of output pages is large or an output mode which needs a long processing time is designated. Even during the output of image data by another operator, so long as the memory has an enough large memory capacity, it is also possible to designate an output mode and to allow the memory for image storage to store image data.

By increasing the memory capacity for image storage, since more jobs can be stored, a down-time can be reduced as a copying machine and a higher productivity can be realized. Even if the copying machine is operating by another process, since the operator can also allow originals to be stored and can designate a job, an efficiency of office works can be also raised.

Since there is an upper limit in the memory capacity for image storage, however, there is a problem such that, when a storage amount of originals increases as compared with an amount of the image data to be read out from the memory for output, a remaining capacity of the memory lacks during the image data storage, and all of the originals of one job cannot be stored, so that an output according to a designated output mode cannot be executed.

SUMMARY OF THE INVENTION

The invention is made to solve the above problem of the conventional techniques. It is an object of the invention to provide an image processing apparatus which can output an image without vainly losing input image data even when a remaining capacity of a memory lacks during the storage of the image data and also to provide a control method of such an apparatus.

Another object of the invention is to provide an image processing apparatus in which, when an output in a designated output mode cannot be executed because of a lack of remaining capacity of memory means, its output mode can be changed and also to provide a control method of such an apparatus.

Still another object of the invention is to provide an image processing apparatus in which, when an output by a designated output mode cannot be executed because of a lack of remaining capacity of memory means, an executable output mode can be selected and to provide its control method.

Further another object of the invention is to provide an image processing apparatus for enabling memory means to be effectively used and also to provide a control method of such an apparatus.

The above and other objects and features of the present invention will become more apparent from the following detailed description and the appended claims with reference to the accompanying drawings.

DETAILED DESCRIPTION OF THE PREFERRED EMBODIMENTS

An embodiment of the invention will now be described in detail hereinbelow with reference to the drawings.

Figure 1:
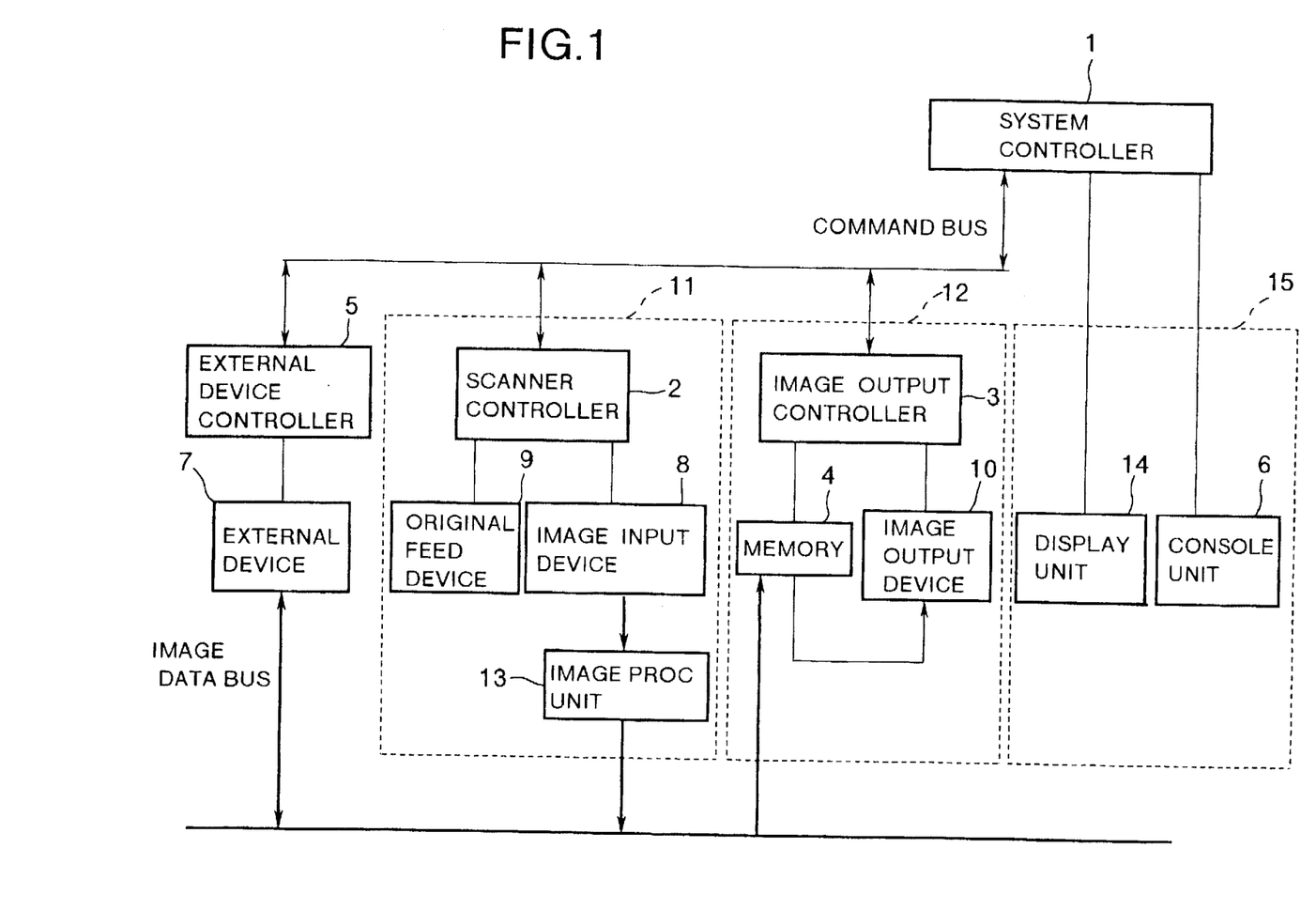
FIG. 1 is a block diagram showing a construction of an image forming system according to an embodiment of the invention.

FIG. 1 is a block diagram showing a construction of an image forming system comprising a copying machine, its controller, an external device, and its controller as an embodiment of the invention.

In FIG. 1, reference numeral 1 denotes a system controller to control the operation of the whole copying machine and performing a sequence control of the whole system on the basis of information inputted by the operation from a console unit 6 by the operator; 2 a scanner controller to control an image input device 8 for reading out originals and converting to image data and an original feed device 9 for sequentially feeding a plurality of originals to the image input device 8; 3 an image output controller to control an image output device 10, having a memory 4 of a large capacity for image data storage and a plurality of kinds of recording sheet cassettes, for generating image data onto a recording paper as a visible image in accordance with an order to print; and 5 an external device controller to control the reception or transmission of data from/to a printer system or an external device 7 such as an LAN or the like.

Reference numeral 11 denotes a scanner unit for reading images and for allowing an image processing unit 13 to process the read image data; 12 an image output unit; 14 a display unit for displaying various information in the main body; and 15 an operation display unit comprising the display unit 14 and the console unit 6.

In such a construction as mentioned above, when originals are set to the original feed device 9 and information to start a copy is inputted by the console unit 6, the copy start information is transmitted to the system controller 1. The system controller 1 considers the allocation of jobs to the above units on the basis of the information and transmits an order to urge the scanner controller 2 to drive an optical system, to read the image data, and the like. The scanner controller 2 which received the order sequentially conveys the originals put on the original feed device 9 one by one to the original support glass surface on the basis of the information of the order. In the image input device 8, the optical system is driven, thereby reading the original images. The image data is transferred to the image processing unit 13. The image processing unit 13 which received the image data performs various kinds of image processes such as zoom, rotation, and the like and sequentially stores the image data into the large capacity memory 4. After the image data was transferred from all of the originals of one set which were set to the original feed device 9, the end of the image reading operation is transmitted to the system controller 1.

The system controller 1 which received a notification indicative of the end of the image reading operation transmits an order to urge the image output controller 3 to start an image formation. The image output controller 3 which received the image formation start order extracts the image data stored in the large capacity memory 4 every page, forms and fixes the image onto the fed recording paper, and ejects the paper to a paper ejection unit. When all of the images are completely finished, the image output controller 3 transmits the end of the image formation to the system controller 1. The system controller 1 which received the end of the image formation transmits a signal indicative of the end of the copying operation for the console unit 6. When receiving the data, the console unit 6 allows the display unit 14 to display a message indicative of the end of the copying operation.

In the embodiment, fundamentally, a plurality of originals of one set are read and stored in the memory and, after that, the images are recorded onto the recording paper. This is because a processing time of the image storage to the memory is generally shorter than that of the image recording to the recording paper, so that the image input device 8 can be rapidly released.

Figure 2:
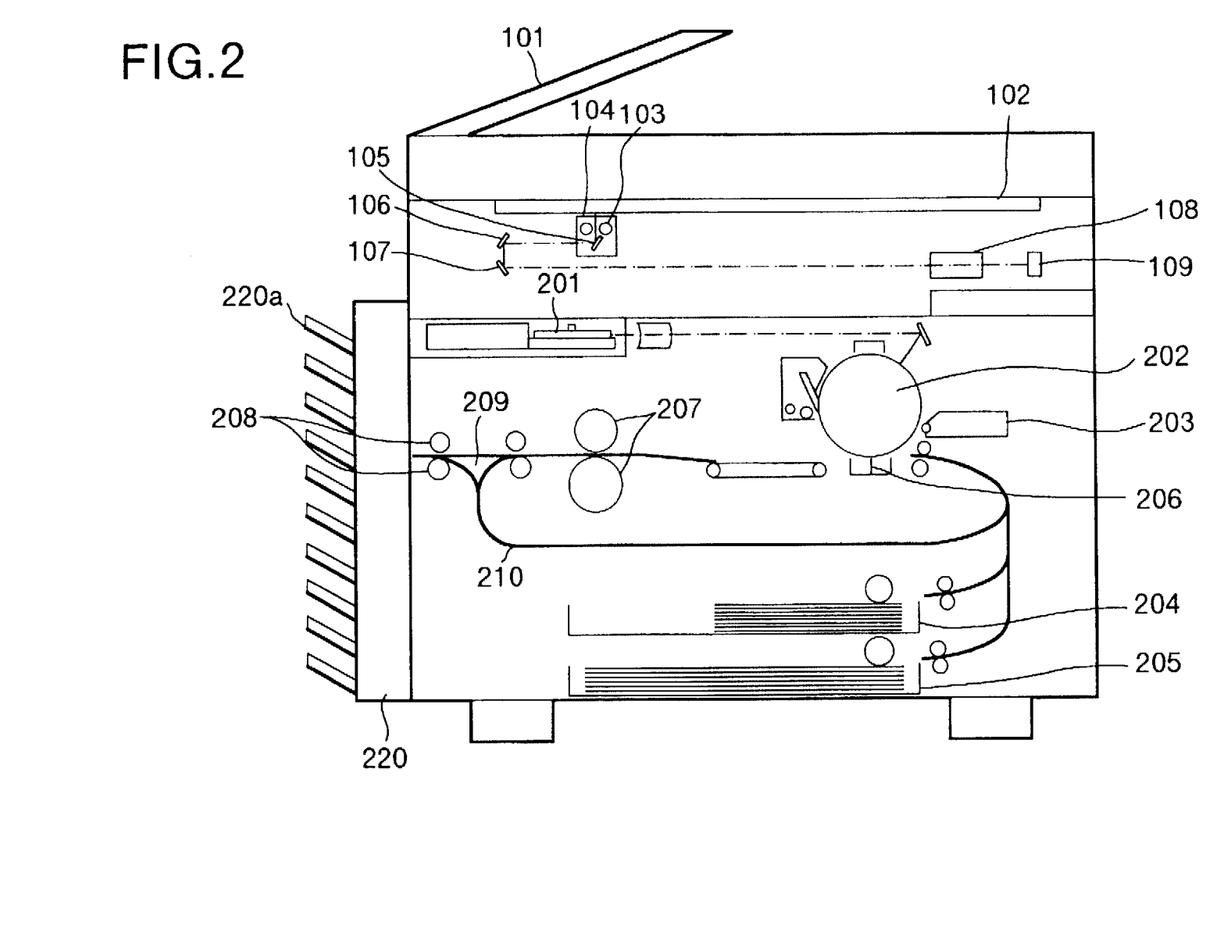
FIG. 2 is a cross sectional schematic diagram showing a construction of a copying machine.

FIG. 2 is a cross sectional view showing a construction of a copying machine comprising the image input device 8 and image output device 10. The construction and operation will now be described hereinbelow.

The originals put on an original feed device 101 in a face-up state are sequentially conveyed one by one onto a glass surface 102 of an original support plate from the last page in accordance with the order by depressing a start key of the console unit 6 of the operation display unit 15 provided for the image input device 8. When the original is conveyed to a predetermined position on the glass surface 102, a lamp 103 of a scanner unit 104 is turned on and the scanner unit 104 moves and irradiates the original. A reflected light of the original is inputted to a CCD image sensor unit 109 (hereinafter, referred to as a CCD) through mirrors 105, 106, and 107 and a lens 108.

The reflected light of the original irradiated to the CCD 109 is photoelectrically converted. A converted electric signal is subjected to various kinds of image processes in an image processing unit 110 and is stored into the large capacity memory 4.

The electric signal stored in the large capacity memory 4 is converted to a modulated photosignal by an exposure control unit 201 in accordance with an image output start order of the image output controller 3 and irradiates a photosensitive material 202. A latent image formed on the photosensitive material 202 by the irradiating light is developed by a developing device 203. A transfer paper is conveyed by a transfer paper stacking unit 204 or 205 so as to match a timing with a front edge of the foregoing developed image. The above developed image is transferred by a transfer unit 206.

The transfer image is fixed to the transfer paper by the fixing unit 207 and, after that, the paper is ejected to the outside of the device by the paper ejection unit 208. The transfer paper ejected from the paper ejection unit 208 is ejected to each bin when a sort function is made operative in a sorter 220. In the case where the sort function is inoperative, the transfer paper is ejected out to a top bin 220a of the sorter.

Subsequently, a method whereby the images to be sequentially read out are outputted to both sides of one output sheet will now be described.

The output sheet fixed by the fixing unit 207 is conveyed to a conveying direction switching member 209 and, after that, the conveying direction of the sheet is reversed and the reversed paper is conveyed to a re-feed conveying unit 210 through the conveying direction switching member 209. The sheet conveyed to the re-feed paper conveying unit 210 is not stopped but is conveyed to an ordinary conveying unit without stopping the paper. The image is transferred to the paper and the paper is conveyed to the paper ejection unit 208 and is ejected to the outside of the device.

In a general analog copying machine or the like, in the case where a one-sided original is copied to both sides of the output sheet, all of the originals pass through to the original feed device one or more times in order to count the number of originals or the like due to some reasons other than that of the reading of the originals. However, according to the copying machine of the embodiment, a CCD image sensor is used as a scanner unit. In the case where the original image is read from the original feed device, the image data is stored into the memory by executing once the original reading operation for each of the originals, so long as the original once passes through the original feed device, the reading process by the scanner is finished.

Figure 3:
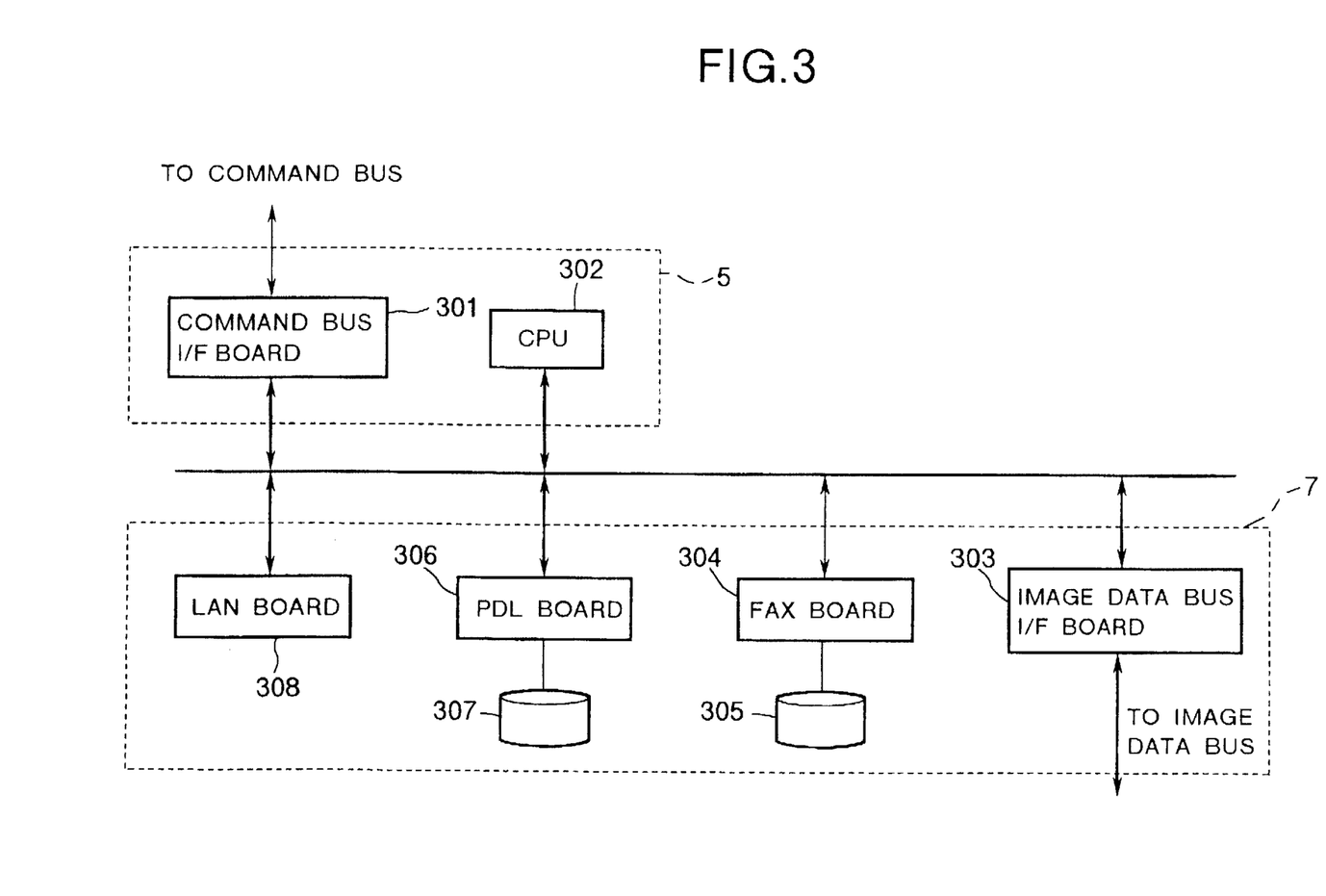
FIG. 3 is a block diagram showing constructions of an external device controller and an external device.

The external device controller 5 and external device 7 in FIG. 1 will now be explained with reference to a block diagram shown in FIG. 3.

Reference numeral 301 denotes a command bus interface; 302 a CPU to control various kinds of external devices; 303 an image data bus I/F board to interface with an image data bus in order to transfer the image data developed by the various kinds of external devices to the image output unit; 304 an FAX board to execute a transmission or reception for a facsimile; 305 a hard disk to store the image data; 306 a PDL board to develop a printer description language which is transmitted from an external computer or the like to bit map data; 307 a hard disk to store printer description language codes; and 308 a board for a local area network (Ethernet or the like).

The operation of the FAX board will now be described. In case of the FAX transmission, the telephone number of the partner side of the facsimile and various parameters such as transfer mode and the like are first set by the console unit 6. Originals to be transmitted are put on the original feed device 9 and the start of the FAX transmission is instructed by the console unit 6. The system controller 1 which received such an instruction transmits an order to read the originals to the scanner controller 2 via the command bus and transmits a request to transfer the FAX image data to the external device controller 5. In the scanner unit 11, the originals put on the original feed device 9 are conveyed one by one onto the original support base plate in a manner similar to the copying operation. The image data read by the scanner unit 11 is transmitted from the image data bus I/F board 303 to the FAX board 304 through the image data bus, thereby performing an FAX transmission to a desired transfer destination.

On the other hand, in case of the FAX reception, after data was received in the FAX board 304, the data is once stored as data compressed by MH, MR, or the like in the hard disk 305. The external device controller 5 notifies the reception of the FAX data to the system controller 1. When receiving the data transfer order from the system controller 1, the compressed data read out from the hard disk 305 is developed to the image data in the FAX board 304. The image data is transferred from the image data bus I/F board 303 to the memory 4 of the image output unit 12 through the image data bus.

Subsequently, the operations of the LAN board 308 and PDL board 306 will now be described. When receiving a print request from a personal computer (not shown) connected by a network such as Ethernet or the like through the LAN board 308, the data is once stored to the hard disk 307 as a page description language code. The external device controller 5 notifies the system controller 1 of a fact that the print data has been stored. After that, when receiving the image data transfer order from the system controller 1, the external device controller 5 allows the PDL board 306 to develop the code data read out from the hard disk 307 to the image data. The controller 5 transfers the image data from the image data bus I/F board 303 to the memory 4 of the image output unit 12 through the image data bus.

As mentioned above, the bit map data is transferred from the external device 7 to the memory 4 of the image output unit 12 through the image data bus.

Figure 4:
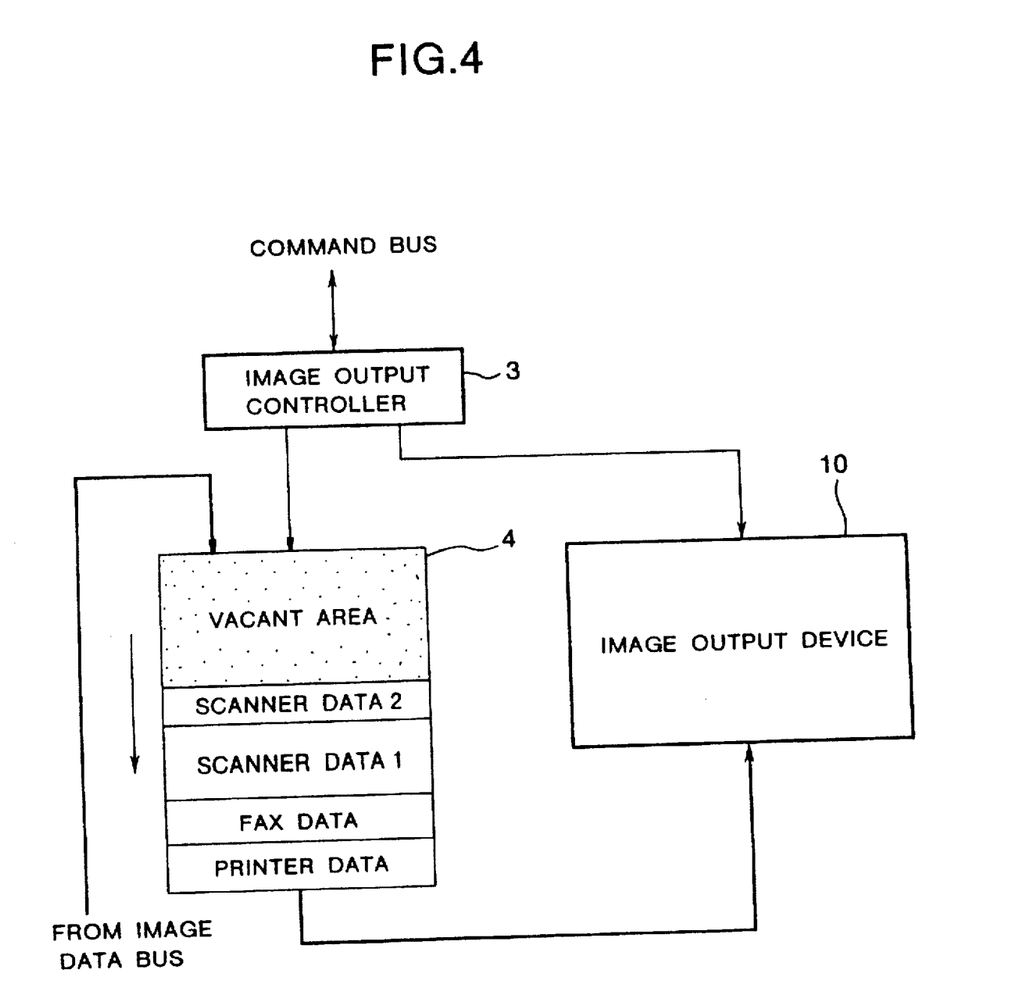
FIG. 4 is a diagram for explaining the reading operation of a memory of an image output unit.

The reading operation from the memory of the image output unit 12 will now be explained with reference to FIG. 4.

Image data of a plurality of jobs such as printer data, FAX data, scanner data 1, and scanner data 2 have been stored in the memory 4. Fundamentally, in accordance with the principle of "First-In First-Out", the image data in the memory 4 is read out and transferred to the image output device 10 and printed out.

In the embodiment, however, the apparatus is constructed in a manner such that the image data of the job which was later stored in the memory can be also previously read out first by the setting of a priority. Since it is necessary to read out the image data of an arbitrary page in correspondence to the output mode, the image data can be also read out on a page unit basis.

Figure 5A:
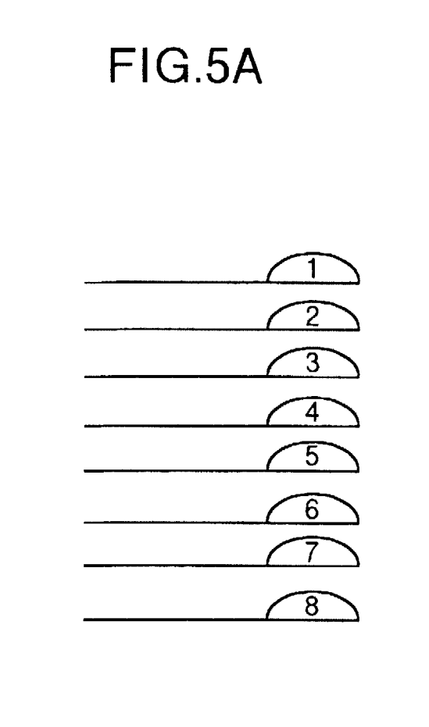
FIGS. 5A and 5B are diagrams for explaining outputs by a brochure mode.
Figure 5B:
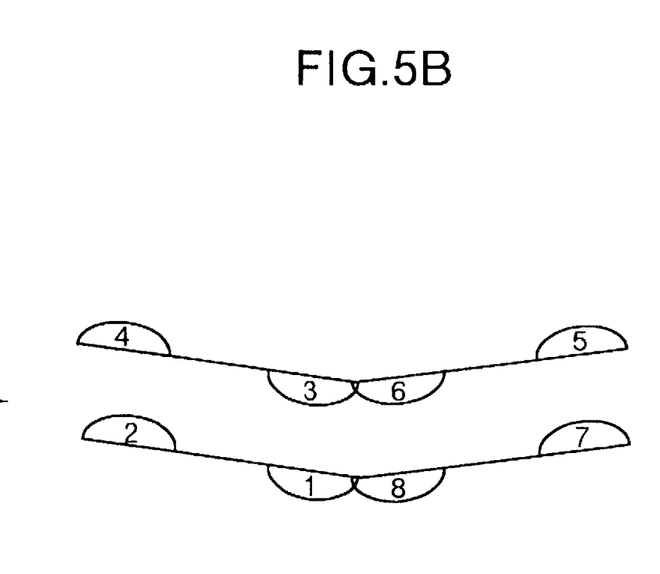

An example of a brochure mode will now be described with respect to the above reading output. When the sheets outputted in the brochure mode are overlaid and folded down, a brochure which can be seen in accordance with the order from the first page is formed. When eight one-sided originals of the A4 size are outputted in the brochure mode as shown in FIG. 5A, two two-sided pages originals of the A3 size of FIG. 5B are derived. The image data reading order from the memory in this instance is as follows. First, the image data corresponding to the first and eighth pages of the originals is read out from the memory 4 and copied to the front surface of the sheet of the A3 size. Subsequently, the image data of the second and seventh pages is copied to the back surface of the sheet of the A3 size. Similarly, the image data of the third and sixth pages is copied to the front surface of the sheet of the A3 size and the image data of the fourth and fifth pages is copied to the back surface. As mentioned above, after all of the originals were first stored in the memory, the image data can be read out in accordance with the order of arbitrary pages in correspondence to the output mode.

Control examples 1 to 3 will now be described hereinbelow with respect to the characteristic operation control of the embodiment with the above construction.

(Control Example 1)

Processes in the case where a one-sided original and a one-sided copy (hereinbelow, referred to as a one—one mode) are selected as an output mode by the operator and the remaining capacity of the memory lacks during the image data storage will now be described in accordance with flowcharts of FIGS. 6 to 8 and 10. Each of those flowcharts shows a control by the system controller.

Figure 6:
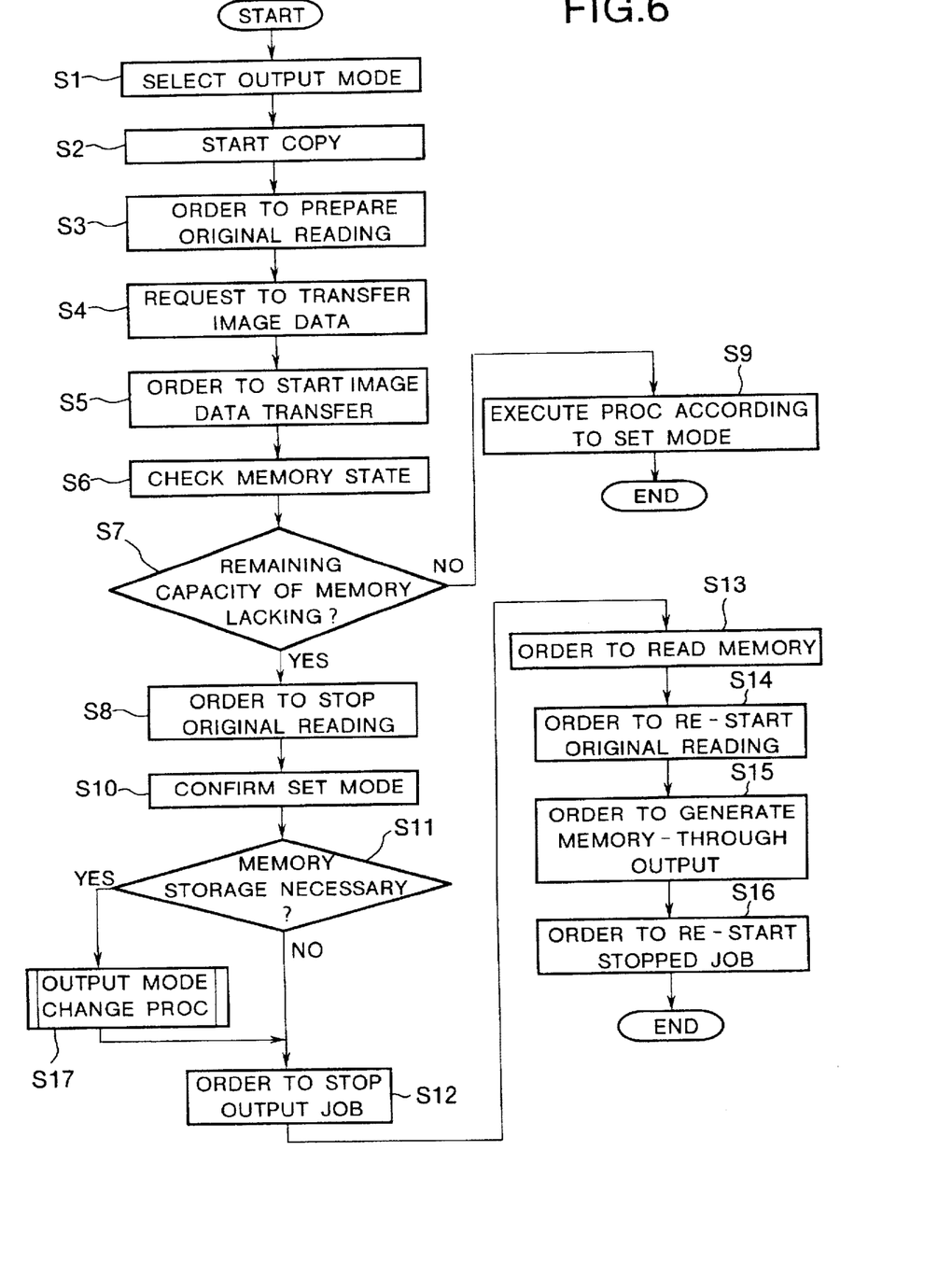
FIGS. 6 to 8 and 10 are flowcharts each showing a flow of the operation of an output process of image data.

First, the one—one mode is selected by the console unit 6 by the operator, originals are put on the original feed device 9, and the copy start is instructed by depressing a start key. The output mode selection and copy start information are transmitted to the system controller 1 in steps S1 and S2, so that jobs are allocated to the devices and an order to prepare the reading of originals such as a driving of the optical system or the like is transferred to the scanner controller 2 (step S3). The scanner controller 2 conveys the originals put on the original feed device 9 onto the original support glass surface in accordance with the order from the first page and prepares to drive the optical system and to read the original images in the image input device 8. Subsequent to the operations, the scanner controller 2 notifies the system controller 1 of a desire to transfer the image data to the memory 4 of the image output unit 12.

The system controller 1 notifies a request to transfer the image data from the scanner 2 to the image output controller 3 (S4). The image output controller 3 which received the request confirms a vacant area in the memory 4 and informs a judgment about whether the image data can be received or not to the system controller 1. In the case where there is a vacant area in the memory 4 and the data can be transferred, the system controller 1 transmits an order to start the transfer to the scanner controller 2 (S5). The scanner controller 2 sequentially conveys the originals to the original support glass plate and starts the reading of the images and the transfer to the memory. The image output controller 3 which receives the image data discriminates the remaining capacity of the memory until the transfer of the data of one job is finished and notifies a memory state to the system controller 1 (S6). At that time, in the case where a plurality of jobs have been stored in the memory as shown in FIG. 4, the image output controller 3 simultaneously executes the reading and writing operations from/to the memory. When an amount of data to be written is larger than an amount of data to be read, the remaining capacity of the memory decreases.

When a lack of the remaining capacity of the memory 4 is confirmed during the data transfer by the image output controller 3, the lack of the remaining capacity of the memory is notified to the system controller 1 (S7). The system controller 1 which received such information transmits an order to stop the reading operation of the originals to the scanner controller 2 (S8). The system controller 1 confirms the designated output mode and discriminates whether the output mode is a mode such that the image data of the originals can be outputted only after all of them were stored into the memory (for example, a brochure mode) or not (S10, S11). Since the one—one mode has been designated at present, it is sufficient to output the read-out image data in accordance with the order as it is. Therefore, when the data is directly transferred to the image output device without storing into the memory, a copy output can be obtained.

The system controller 1 stops another job in which images are outputted at present (S12) and instructs the image output controller 3 so that the image data which has already been stored in the memory is sequentially read out in accordance with the reading order in order to newly output the data of the original which is being read at present (S13). When the data up to the image data of the page just before the stop of the reading operation is transferred, a message to re-start the reading operation of the originals is notified to the system controller 1. The system controller 1 instructs the scanner controller 2 to re-start the reading operation of the originals (S14).

On the other hand, the system controller 1 instructs the image output controller 3 to directly transfer the read-out image data to the image output device without storing into the memory (S15).

In this instance, subsequent to the image data of the memory in the image output device, the image data from the scanner passes through the memory and is transferred to the image output device 10, so that a one-sided copy original is obtained. The job stopped in step S8 in a state in which there is no remaining capacity of the memory is re-started (S16).

In this case, it is also possible to construct in a manner such that although another job during the output was stopped and the reading operation of the originals was re-started, the job during the output is not stopped, the image data after completion of the output is deleted from the memory, and the reading operation of the originals is re-started after the apparatus waits until a vacant area is secured.

(Control Example 2)

Subsequently, processes in the case where the brochure mode is selected as an output mode by the operator and the remaining capacity of the memory lacks during the image data storage will now be described.

The brochure mode is designated from the console unit 6 by the operator. In a manner similar to the control example 1, the originals put on the original feed device 9 are conveyed and the image data is read out (S1 to S5).

Similarly, when it is confirmed that the remaining capacity of the memory 4 lacks by the image output controller 3, the lack of remaining capacity of the memory is notified to the system controller 1 (S6, S7). The system controller 1 which received such a notification transmits an order to stop the reading operation of the originals to the scanner controller 2 (S8). The system controller 1 confirms the designated output mode and discriminates whether the output mode is a mode such that the images of the originals can be outputted only after all of them were stored into the memory (for example, the brochure mode) or not (S10, S11).

Figure 7:
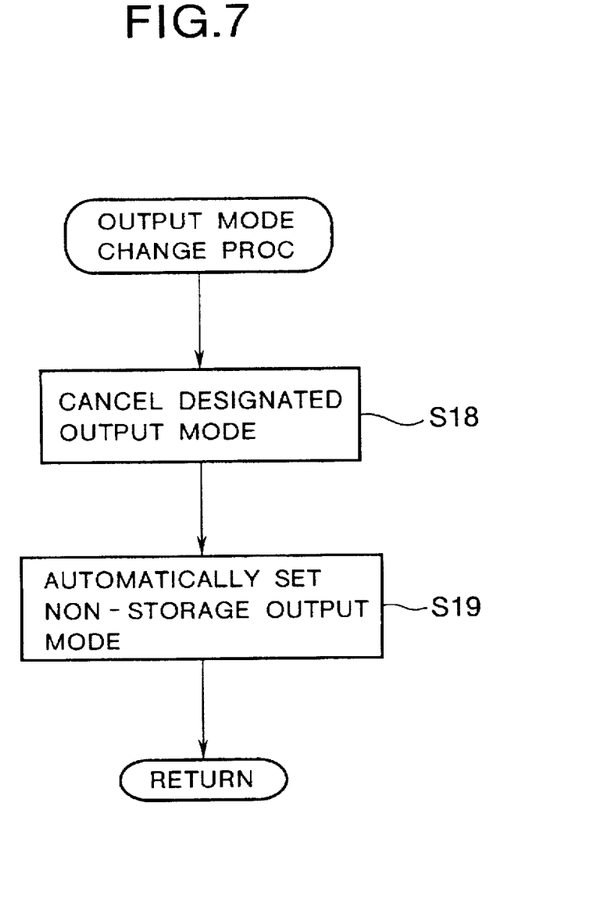

Since the brochure mode has already been designated at present, the images can be output only after all of the originals were stored into the memory. Therefore, step S17 follows and an output mode changing process is performed.

In this case, since the output in the brochure mode cannot be executed, the system controller 1 cancels the brochure mode in step S18 and automatically sets the output mode such that the data can be outputted without being stored into the memory in step S19. In case of changing the output mode as mentioned above, it is also possible that a display to the display unit and a notification by an alarm sound are performed and in the case where the operator executes the operation indicative of a permission from the console unit, the output mode is changed and the data is outputted. When the non-storage output mode, for example, the one—one mode is set, step S12 follows and the one-sided copy is performed in a manner similar to the control example 1 and is outputted.

In such a control example, since the brochure mode such that the originals can be outputted only after all of them were stored into the memory has been designated, the brochure mode is cancelled and the one—one mode is automatically set as a non-storage output mode. Depending on the user, however, there is a case where the user doesn't desire an output other than the output in the designated output mode or a case where he desires another output mode. That is, there is a case where since it is not a rapid job, the user wants to output after a jam of the jobs was eliminated or he wants to newly set another output mode. The output mode changing process (S17) in this case will now be described on the basis of a flowchart shown in FIG. 8.

Figure 8:
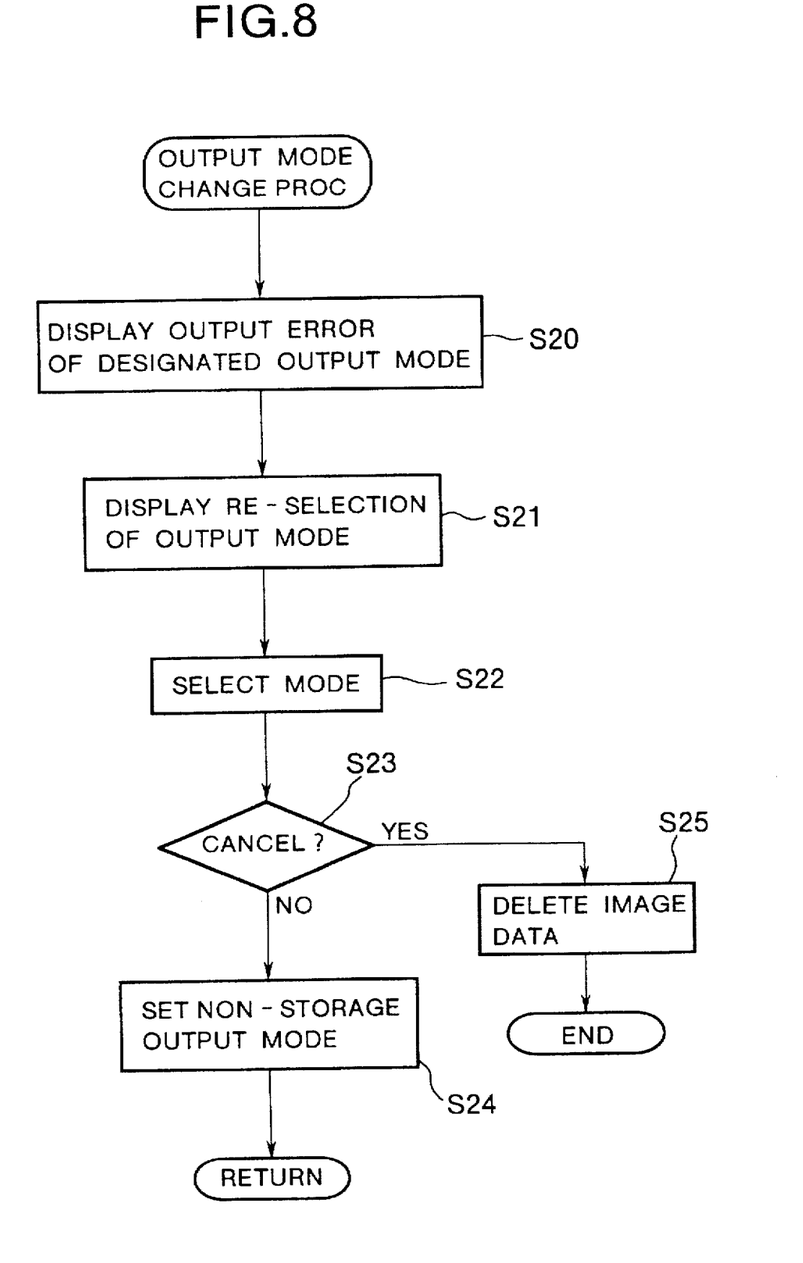

When it is judged in step S11 in FIG. 6 that the designated output mode is a mode such that it is necessary to store all of the originals into the memory, the processing routine advances to a routine for the output mode changing process shown in FIG. 8.

First in step S20, the system controller 1 allows the display unit 14 to display that the designated output mode cannot be executed because of errors due to the lack of remaining capacity of the memory and also alarms such a situation by a buzzer or the like. In step S21, the designated job is cancelled or a re-selection menu for re-selecting the executable output mode is displayed to the display unit 14. As a display in this instance, the output mode which can be executed without storing all of the originals into the memory, for example, the one—one mode or one-two mode (the two-sided sided copy is performed from the one-sided original) is displayed. A message indicating that the mode such as a brochure mode or the like in which all of the originals must be stored into the memory cannot be selected is displayed. Further, a message indicating that the cancellation of the designated output mode can be also selected is also displayed.

In step S22, the mode selected by the operator is discriminated on the basis of the display in step S21. When it is judged in step S21 that the cancellation was selected, step S25 follows and the original images stored in the memory so far are deleted on the basis of the designated output mode, the job is cancelled, and the processing routine is finished.

On the other hand, when the cancellation is not designated but the execution of another non-storage output mode without storing into the memory is designated, the re-selected output mode is selected in step S24. The output processes in step S13 and subsequent steps are executed without storing into the memory.

As further another selection, it is also possible to permit to wait for the reading operation of the originals until an enough vacant area in the memory is secured without cancelling nor selecting another output mode.

(Control Example 3)

A case where, when the priorities have been previously set in accordance with the kinds of jobs and the brochure mode is set, the remaining capacity of the memory lacks will now be described.

It is assumed that the priority of the output job of the image data (scanner data) from the scanner is set to be higher than that of the output job as a printer to print the image data (printer data) transmitted from the external device 7.

Figure 9A:
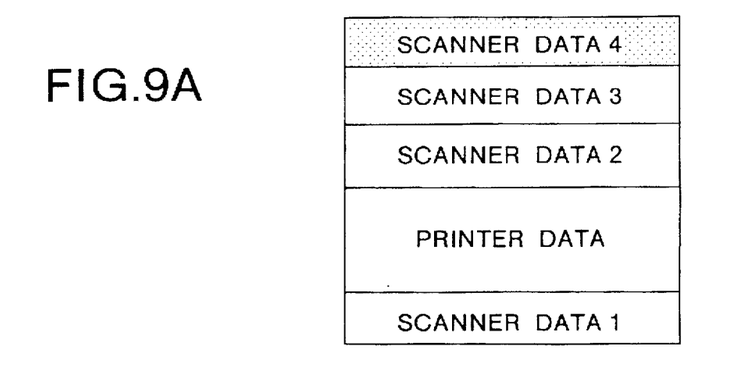
FIGS. 9A to 9C are diagrams each showing an input state of image data according to an output job to a memory.
Figure 9B:
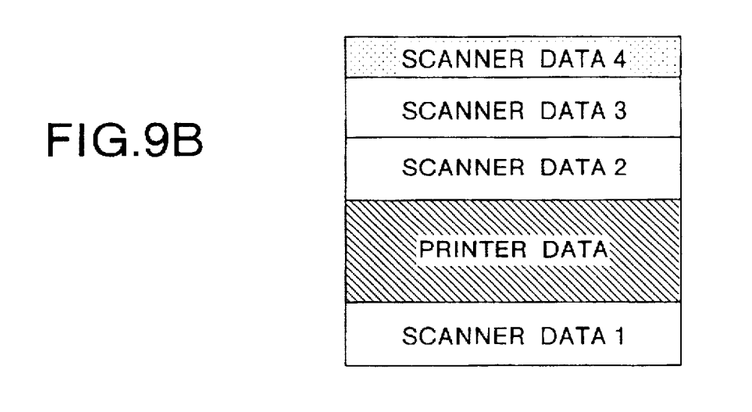
Figure 9C:
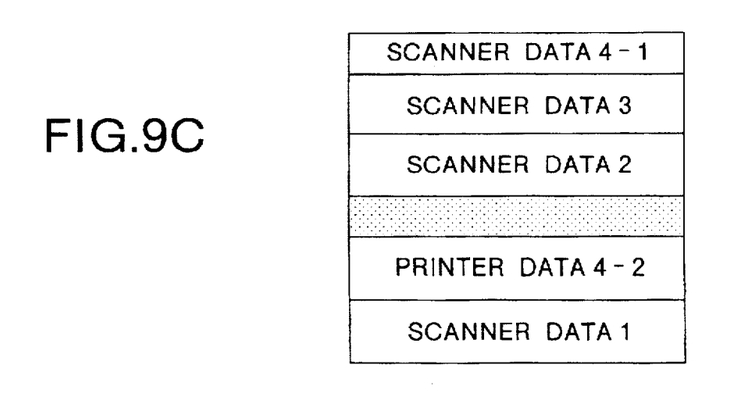

FIGS. 9A to 9C show examples of the input states of the image data according the output jobs of the memory. In FIG. 9A, it is assumed that scanner data 1, 2, and 3 and printer data have already been stored in the memory and scanner data 4 is being read at present.

Figure 10:
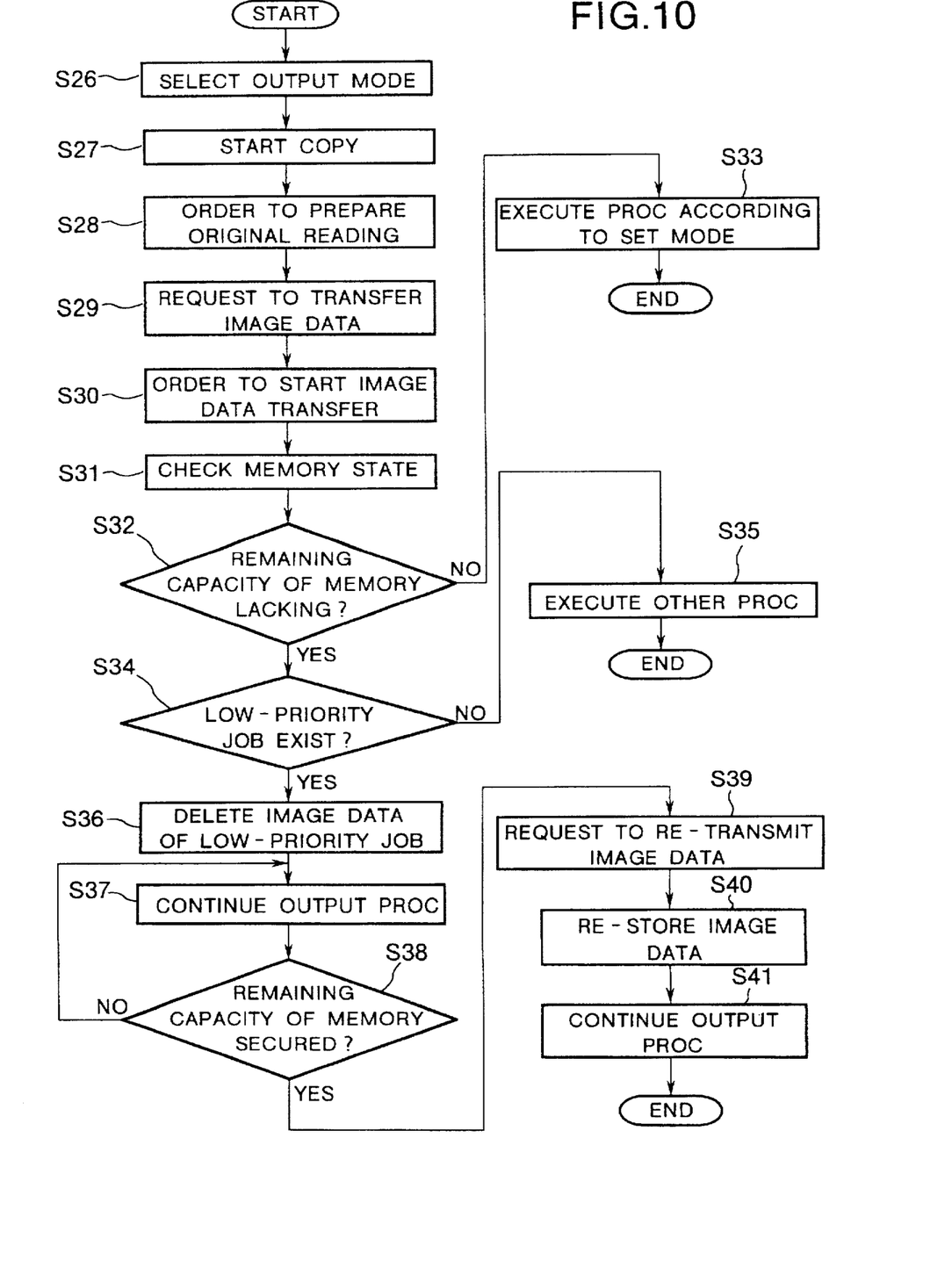

A flow of the processes in this case will now be explained on the basis of a flowchart shown in FIG. 10.

Up to step S32, the remaining capacity of the memory 4 is discriminated by the image output controller 3 in a manner similar to the above control example. When the lack of the remaining capacity is confirmed and it is notified to the system controller 1, since an output impossible mode has been set because of the lack of the remaining capacity of the memory, step S34 follows and a check is made to see whether the image data according to the job of a priority lower than that of the scanner data to be read out at present has been stored or not. When there is no low-priority job, step S35 follows and the processes by the control example as mentioned above or the cancellation of the job is executed and the processing routine is finished.

On the other hand, when there is low-priority printer data as shown in FIG. 9B, such a fact is notified to the system controller 1 and step S36 follows. When the output of the printer data is not started, the printer data is deleted from the memory 4. A fact that the image data was deleted is notified to the transmission destination of the deleted image data, in this instance, to the PDL board 306. The transmission destination of the deleted image data and the data amount are stored. The processing routine advances to step S37 and the read-out image data is stored into an area in which the printer data was deleted as shown in FIG. 9C and the output process by the designated output mode is continued. When it is judged in step S38 that an enough vacant area in the memory 4 is secured in order to store the printer data deleted in step S36, step S39 follows. A request to re-transmit the image data deleted from the memory 4 is transmitted to the PDL board 306 stored as a transmission destination. The PDL board 306 which received such a request reads out the corresponding PDL code data from the hard disk 307. After the PDL code was developed to the bit map data, the data is re-transmitted to the memory 4. It is now assumed that the PDL code data has been stored in the hard disk 307 until the PDL code data is outputted from the image output device.

Subsequently, the image data transmitted from the PDL board 306 is again stored into the memory 4 in step S40. The output process is continued in step S41.

Even when the above mentioned priorities are not set, in the case where data like printer data or facsimile data has been stored in a medium such as a hard disk, different from the scanner data, those image data can be again inputted into the memory without making the user troublesome, the above data is preferentially deleted in a manner similar to the above control example and is again stored after the stored scanner data was outputted.

The priority can be also set every kind of job (1: scanner, 2: PDL, 3: FAX). It is also possible that, for example, a key indicative of emergency is provided for the console unit 6 and, when such a key is depressed or a signal that is almost equivalent to it is inputted, the data is preferentially outputted.

As mentioned above, according to the embodiment, in the case where the image data is once stored into the memory and is printed, even if the memory capacity is filled with the received data, various kinds of countermeasures can be executed. By constructing so as to once store the image data into the memory, the image data regarding many jobs can be accepted, so that an exclusive operating time of the apparatus can be reduced.

As described above, according to the invention, in the image forming apparatus having the memory for image storage, since the stored data in the waiting state for outputting exists in the memory, even in the case where the remaining capacity of the memory lacks during the storage of the image data, the inputted image data can be outputted in the designated output mode without vainly losing the data as possible.

Although the present invention has been explained on the basis of the preferred embodiments, the invention is not limited to the foregoing embodiments but many modifications and variations are possible within the spirit and scope of the appended claims of the invention.

What is claimed is:

1. An image processing apparatus for outputting image data in accordance with a designated output mode, comprising:

input means for inputting the image data in a unit of a page;

memory means for storing the image data inputted by said input means;

output means capable of outputting the image data stored in said memory means in accordance with the output mode;

discriminating means for discriminating a memory space of said memory means;

change means for changing the output mode in a case where it is discriminated by said discriminating means that the memory space of said memory means is insufficient; and control means for controlling said change means such that, in a case where the designated output mode is a mode in which the image data inputted by said input means is outputted in a discontinuous order of a page, said designated output mode is changed to a mode in which the image data inputted by said input means is outputted in a continuous order of a page.

2. An apparatus according to claim 1, wherein said designated output mode is a brochure mode.

3. An apparatus according to claim 1, further having selecting means for selecting subsequent processes in a case where it is discriminated by said discriminating means that the memory space of said memory means is insufficient.

4. An apparatus according to claim 3, wherein said change means changes the output mode in the case where another output mode is selected by said selecting means.

5. An apparatus according to claim 3, further having deleting means for, in the case where it is selected to cancel a job regarding the image data that is being inputted by said input means, deleting said image data regarding said job from said memory means.

6. An image processing apparatus for outputting image data in accordance with a designated output mode, comprising:

input means for inputting the image data;

memory means for storing the image data inputted by said input means;

output means capable of outputting the image data stored in said memory means in accordance with said output mode;

discriminating means for discriminating a memory space of said memory means; and selecting means for selecting, on the basis of a manual instruction, an another output mode that can be executed in a case where it is discriminated by said discriminating means that the memory space of said memory means is insufficient.

7. An apparatus according to claim 6, further having display means for displaying so that said executable output mode can be selected by said selecting means.

8. An apparatus according to claim 6 or 7, wherein said selecting means includes means for cancelling a job regarding the image data which is being inputted by said input means, and said apparatus further has means for deleting the image data regarding said job from said memory means in the case where a cancellation is selected.

9. An image processing apparatus for outputting image data in accordance with a designated output mode; comprising:

input means for inputting the image data;

memory means for storing the image data inputted by said input means;

output means capable of outputting the image data stored in said memory means in accordance with said output mode;

discriminating means for discriminating a memory space of said memory means;

deleting means for deleting the image data regarding another job from said memory means in a case where it is discriminated by said discriminating means that the memory space of said memory means is insufficient; and request means for, in the case where it is discriminated by said discriminating means that the memory space is equal to a capacity such that said memory means can again store the image data deleted by said deleting means, requesting a sending side of said image data to transfer said image data to said memory means.

10. An apparatus according to claim 9, wherein said deleting means deletes the image data stored in said memory means on the basis of a preset priority.

11. A control method of an image processing apparatus for outputting image data in accordance with a designated output mode, comprising:

an input step of inputting the image data in units of a page;

a memory step of storing the image data inputted in said input step into memory means;

an output step of outputting the image data stored in said memory means in accordance with the output mode;

a discriminating step of discriminating a memory space of said memory means;

a change step of changing the output mode in a case where it is discriminated in said discriminating step that the memory space of said memory means is insufficient; and a control step of controlling said change step such that, in the case where the designated output mode is a mode in which the image data inputted by said input step is outputted in a discontinuous order of a page, said designated output mode is changed to a mode in which the image data inputted by said input step is outputted in a continuous order of a page.

12. A method according to claim 11, wherein said designated output mode is a brochure mode.

13. A method according to claim 11, further having a selecting step of selecting subsequent processes in a case where it is discriminated in said discriminating step that the memory space of said memory means is insufficient.

14. A method according to claim 13, wherein in said change step, in the case where another output mode is selected in said selecting step, the output mode is changed in said change step.

15. A method according to claim 13, further having a deleting step of, in the case where it is selected to cancel a job regarding the image data that is being inputted in said input step, deleting said image data regarding said job from said memory means.

16. A control method of an image processing apparatus for outputting image data in accordance with a designated output mode, comprising:

an input step of inputting the image data;

a memory step of storing the image data inputted in said input step into memory means;

an output step of outputting the image data stored in said memory means in accordance with said output mode;

a discriminating step of discriminating a memory space of said memory means; and a selecting step of selecting, on the basis of a manual instruction, an another output mode that can be executed in the case where it is discriminated in said discriminating step that the memory space of said memory means is insufficient.

17. A method according to claim 16, further having a display step of displaying to display means so that said executable output mode can be selected in said selecting step.

18. A method according to claim 16 or 17, wherein said selecting step includes a step of cancelling a job regarding the image data which is being inputted in said input step, and said method further has a step of deleting the image data regarding said job from said memory means in the case where a cancellation is selected.

19. A control method of an image processing apparatus for outputting image data in accordance with a designated output mode, comprising:

an input step of inputting the image data;

a memory step of storing the image data inputted in said input step into memory means;

an output step of outputting the image data stored in said memory means in accordance with the output mode;

a discriminating step of discriminating a memory space of said memory means;

a deleting step of deleting the image data regarding another job from said memory means in a case where it is discriminated in said discriminating step that the memory space is insufficient; and a request step of, in the case where it is discriminated by said discriminating step that the memory space is equal to a capacity such that said memory means can again store the image data deleted by said deleting step, requesting a sending side of said image data to transfer said image data to said memory means.

20. A method according to claim 19, wherein in said deleting means, the image data stored in said memory means is deleted on the basis of a preset priority.

* * * * *

UNITED STATES PATENT AND TRADEMARK OFFICE
CERTIFICATE OF CORRECTION

PATENT NO. : 5,734,482

DATED : March 31, 1998

INVENTORS : RYOSUKE MIYAMOTO ET AL.

It is certified that error appears in the above-identified patent and that said Letters Patent is hereby corrected as shown below:

ON THE COVER PAGE

[30] Foreign Application Priority Data

"Jun. 22, 1994 [JP] Japan....7-156545" should read --Jul. 5, 1995 [JP] Japan....7-169796--.

Column 1 line 30, "an enough large" should read --a large enough--; and
line 40, "works" should read --work--.

Column 2 line 17, "cross sectional" should read --cross-sectional--.

Column 3 line 13, "were set" should read --were sent--; and
line 38, "cross sectional" should read --cross-sectional--.

Column 4 line 35, "originals, so" should read --originals. So--.

UNITED STATES PATENT AND TRADEMARK OFFICE
CERTIFICATE OF CORRECTION

PATENT NO. : 5,734,482

DATED : March 31, 1998

INVENTORS : RYOSUKE MIYAMOTO ET AL.          Page 2 of 2

It is certified that error appears in the above-identified patent and that said Letters Patent is hereby corrected as shown below:

Column 9 line 47,   "above mentioned" should read --above-mentioned--; and    line 51,   "making the user troublesome," should read --causing the user problems,--.

Column 11 line 15,   "mode;" should read --mode,--.

Column 12 line 62,   "deleting means" should read --deleting step,--.

Signed and Sealed this

Fifteenth Day of December, 1998

Attest:

BRUCE LEHMAN

*Attesting Officer*    *Commissioner of Patents and Trademarks*